(12) United States Patent
Dhara et al.

(10) Patent No.: US 9,361,604 B2
(45) Date of Patent: Jun. 7, 2016

(54) SYSTEM AND METHOD FOR A CONTEXT-BASED RICH COMMUNICATION LOG

(75) Inventors: Krishna Kishore Dhara, Dayton, NJ (US); Rajeshwari Edamadaka, Allentown, NJ (US); Venkatesh Krishnaswamy, Holmdel, NJ (US); Eunsoo Shim, Princeton Junction, NJ (US); Xiaotao Wu, Edison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1170 days.

(21) Appl. No.: 12/978,936

(22) Filed: Dec. 27, 2010

(65) Prior Publication Data

US 2012/0079099 A1 Mar. 29, 2012

Related U.S. Application Data

(60) Provisional application No. 61/385,842, filed on Sep. 23, 2010.

(51) Int. Cl.
*G06F 15/173* (2006.01)
*G06Q 10/10* (2012.01)

(52) U.S. Cl.
CPC .................................. *G06Q 10/107* (2013.01)

(58) Field of Classification Search
USPC .......... 709/224, 203, 206, 217, 219, 223, 240
See application file for complete search history.

(56) References Cited

U.S. PATENT DOCUMENTS

| | | | |
|---|---|---|---|
| 7,653,660 B2 | 1/2010 | Frieden et al. | |
| 7,702,315 B2 | 4/2010 | Engstrom et al. | |
| 7,769,144 B2 | 8/2010 | Yao et al. | |
| 2010/0115084 A1* | 5/2010 | Caspi et al. | 709/224 |
| 2010/0169480 A1* | 7/2010 | Pamidiparthi | 709/224 |
| 2013/0218993 A1* | 8/2013 | Dhara et al. | 709/206 |

* cited by examiner

*Primary Examiner* — Quang N Nguyen
(74) *Attorney, Agent, or Firm* — Sheridan Ross P.C.

(57) ABSTRACT

Disclosed herein are systems, methods, and non-transitory computer-readable storage media for generating a context-based rich communication log. A system configured to practice the method performs a context-based analysis of a history of communication sessions over at least two communication modalities, wherein the context-based analysis considers semantic meaning, temporal relationship, and user activities. The system generates associations between the communication sessions based on the context-based analysis, and generates the context-based rich communication log based on the associations. The context-based analysis can be based on time, session participant identifications, ongoing events, and/or on-demand queries of the communication sessions. The system can then present the context-based rich communication log to a user. The context-based rich communication log can be used as part of at least one of a predictive contacts application, a topic analyzer, a conferencing application, and a personal communication assistant, for example.

17 Claims, 6 Drawing Sheets

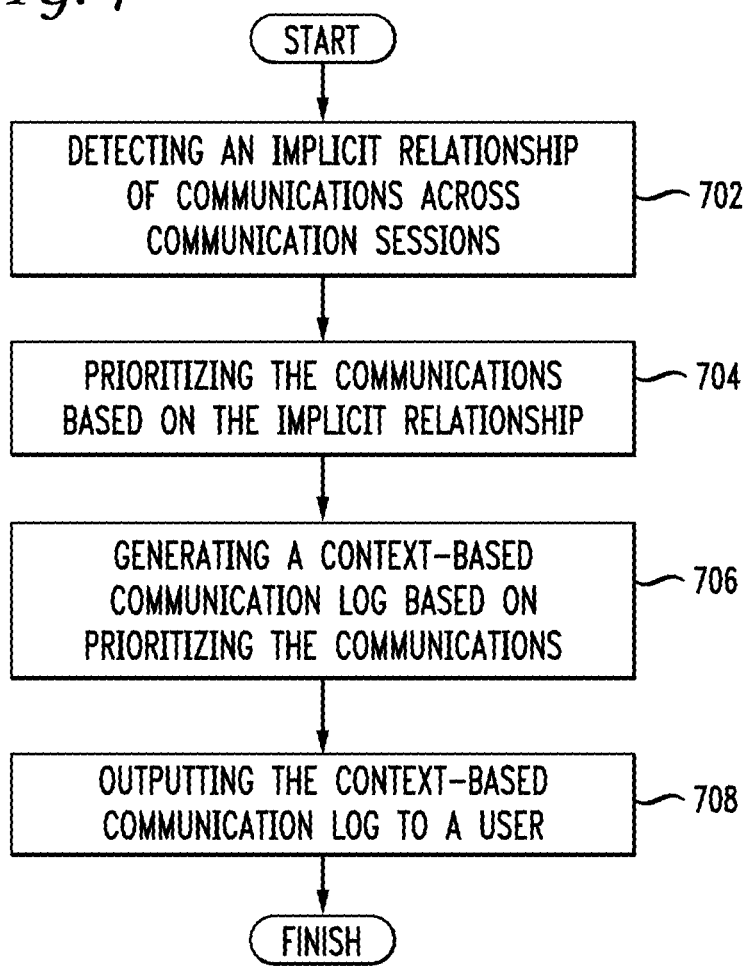

SYSTEM AND METHOD FOR A CONTEXT-BASED RICH COMMUNICATION LOG

RELATED APPLICATIONS

This application claims priority to U.S. Provisional Patent Application 61/385,842, filed 23 Sep. 2010, the contents of which are incorporated herein by reference.

BACKGROUND

1. Technical Field

The present disclosure relates to interpersonal communications and more specifically to unified communications based on context and spanning multiple communication modalities.

2. Introduction

Unified communication is an evolving communications technology architecture which automates and unifies all forms of human and device communications in context, and with a common experience. Its purpose is to optimize business processes and enhance human communications by reducing latency, managing flows, and eliminating device and media dependencies. One challenge facing unified communication system is how to identify implicit relationships, such as invoking, triggering, containing, and continuing relationship, among different communication sessions, such as call, IM, email, voicemail, and short voice and video messages. Identifying these relationships can help users better manage their conversations that have different modalities and on different devices.

Further this implicit relationship identification should be based on latent content or contextual content of the emails. That is when a new mail is initiated or received, if the topic of the email, based on its content or context, is known then the system can identify the relationship and place the email in a similar conversation thread.

One approach in the art, a project named Loom, allows users manually group conversations into threads. Another commercial practice is to track explicit "replying" or "forwarding" relationship among email messages, such as in Outlook and other email clients. Another slightly more advanced approach is track the subject and participants of email messages, such as Gmail.

In Google Wave, a discontinued commercial project that continues in an open source efforts under the "Wave in a Box" project, a wave is similar to a communication thread which holds all related conversations in one container. Google Wave requires users to explicitly drop messages in a wave. These and other presently available solutions rely on explicit user behavior (replying or forwarding) to group messages into threads without any detailed analysis to find an implicit relationship among messages or other automatic grouping of messages into one thread.

Traditional unified communication applications focus on integrating different communication channels, such as voice, video, instant messaging, email, voicemail, and presence, into one inbox. This is a foundation for more complicated unified communication functions. However, as more communication channels are integrated and the number of messages rapidly grows in people's inboxes, people require a more intelligent and efficient way to organize their inboxes.

Recently, Google's email service, Gmail, released a new feature called Priority Inbox. Gmail's Priority Inbox tries to identify users' important emails so users can handle important messages first. This feature is still in its beta stage but shows a useful concept of helping users to organize or at the very least prioritize their inbox.

Another example of providing intelligence in users' inboxes is an application called Xobni. Xobni can create rich profiles for every person with whom a user has ever communicated. The profiles include communication statistics, social connections, and communication histories. For an email, Xobni can automatically show people profiles related to that email. Gmail Priority Inbox and Xobni are two complementary applications. One reduces information to avoid distractions, while the other enriches information to improve productivity. However, unified communications still have many shortcomings which become more and more evident as the size, type, and quantity of online communications increase.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

This disclosure presents a unified communication application that helps enterprise users to organize their communication log. The organized communication log can then facilitate more efficient enterprise communications by easily retrieving and accessing important communications and predicting users' future communication behaviors. The application can handle different communication sessions (voice and video calls, emails, instant messages, voicemails, and short voice and video messages), process different communication contexts (incoming/outgoing calls, pre/post communication, ad-hoc/meet-me/web conferencing), and present the information in different views (context-based sorting and grouping). This disclosure presents the system in detail and addresses several challenges of developing the system, including importance and relevance calculation for sessions with different modalities, context-based computing, and thread analyzing. The system can analyze implicit relationship among conversations with different modalities and group them into threads.

The disclosed system can identify implicit relationships, such as invoking, triggering, containing, and continuing relationship, among different communication sessions, such as call, IM, email, voicemail, and short voice and video messages. Identifying these relationships can help users better manage their conversations that have different modalities and on different devices.

Invoking relationship means that a user starts a conversation picking up from the context of related previous conversation. For example, a user clicks-to-call a phone number in an email, the system can consider the email and the call as being in the same thread and associate or link the email and the phone call. Both triggering and containing relationship try to find out the temporal and participant relationship among sessions with different communication channels. Triggering means that a user starts one session because he or she just accessed another session. For example, a user A receives an email from another user B. After reading the email, A immediately makes a call to B. In another example, A just finishes a call with B. Immediately thereafter, A sends an email to B with some documents. In both examples, the system can consider the call and the email as part of the same thread and having a triggering relationship.

Containing means that during a conversation such as a voice/video call, the participants communicate via one or more other channels such as IM or email. The new session is contained in the original session and the system considers them as part of a single communication thread. Continuing means that one session immediately follows another session with same participants (or a substantially similar subset of participants) and the same or similar media type. This is usually used for voice/video calls, for example, when a call is dropped and immediately reconnected. Similarly, if the video call on Skype drops, then the users can continue on a video call using a different service, such as FaceTime from Apple, but still in the same general medium of video calls. These new relationship can be combined with existing replying/forwarding relationships among conversations to group conversations into communication threads.

For a new communication session the system uses the topic associated with the communication session to appropriately identify the implicit relationship thread to which the session belongs. Once the implicit relationships between sessions (emails, IM, voicemail, short voice and video messages) have been established, applications can search using threads, topics, related people, and/or other criteria. The search, information retrieval based on 'related' items can be enhanced by applying implicit relationship analysis and topic analysis.

For a simple illustration on how applications can use this approach, consider the following. While applications using the existing art are limited to explicit grouping by labels, reply, forward, etc., an application that is based on the disclosed implicit relationships can be much more expressive, providing views such as group by implicit threads or group by topics.

The method disclosed herein can help users organize their conversation history, which in turn can help users to easily find their historical conversations and improve their work efficiency. This method can be applied to any unified communication server domestic and/or international.

Disclosed are systems, methods, and non-transitory computer-readable storage media for generating a context-based rich communication log which users can then search, sort, and browse. The system first performs a context-based analysis of a history of communication sessions over at least two communication modalities, wherein the context-based analysis considers semantic meaning, temporal relationship, and user activities. The communication sessions can include email, instant message, telephone call, voice over IP, text message, social network communication, documents, collaborative interactions, and multimedia interactions. Then the system generates associations between the communication sessions based on the context-based analysis. The system generates the context-based rich communication log based on the associations. The context-based analysis can be based on at least one of time, session participant identifications, ongoing events, and on-demand queries of the communication sessions. The system can optionally present the context-based rich communication log to a user and provide a way for the user to browse, search, sort, and otherwise view and manipulate the communications represented in the context-based rich communication log.

For example, the system can receive a context-based query from a user, identify a subset of communication sessions from the history of communication sessions that matches the context-based query based on the context-based rich communication log, and return the subset of communication sessions to the user. The system can process the communication sessions to learn the semantic meaning, temporal relationship, and user activities. The context-based rich communication log can be used as part of predictive contacts application, a topic analyzer, a conferencing application, and/or a personal communication assistant.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7 illustrates a second exemplary method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improved unified communication systems. A brief introductory description of a basic general purpose system or computing device in FIG. 1 which can be employed to practice the concepts is disclosed herein. A more detailed description of various details of the context-based rich communication log will then follow. These details and variations shall be discussed herein as the various embodiments are set forth. The disclosure now turns to FIG. 1.

Figure 1:
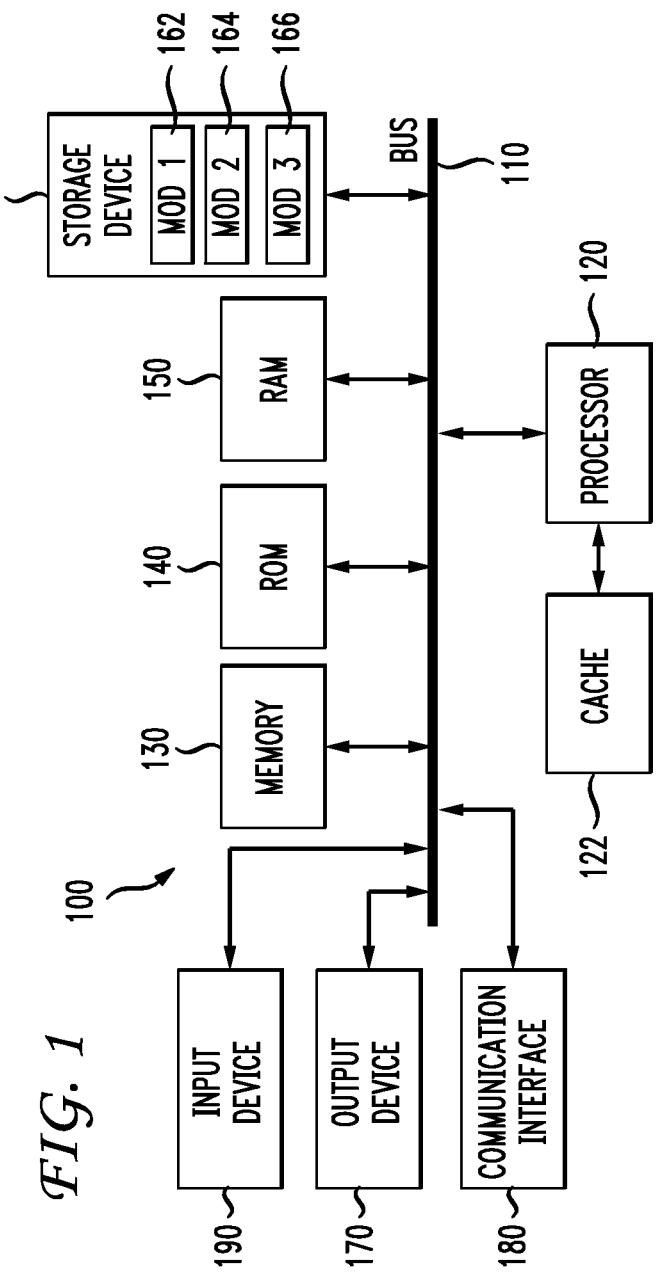
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now returns to a discussion of the context-based rich communication log. The focus of the rich communication log is not on unifying different forms of communications, but instead focuses on automating, optimizing, and enhancing users' communication experiences on a unified inbox.

A rich communication log is an application that collects users' communication session information and presents the information in user-customizable views under different communication contexts. The communication sessions can be voice or video calls, instant messages, emails, voicemails, and short voice and video messages (SVVMS). The customizable views can be any combination of different sorting and grouping mechanisms, such as sorting by time, importance, relevance, and/or people, and grouping by topic, thread, and/or session status. The content of rich communication log can vary in different communication contexts. The communication contexts can be pre/post-communications, incoming/outgoing sessions, ad-hoc/meet-me meetings, and/or on-demand queries. More detailed description of sorting and grouping mechanisms and communication contexts will be presented below. While the rich communication log disclosed herein may appear superficially similar to other unified communication inboxes, its underlying logic is intrinsically different from existing unified communication applications.

Among other differences, this approach updates its content based on context-based computing. Context related information can be time, session participants' identifications, ongoing events, or on-demand queries. This approach also interconnects communication sessions across different modalities by learning their semantic meanings, temporal relationships, and associated user activities. Further, this approach can be embedded in a larger context-based communication platform and interact with other context-based communication applications, such as a predictive contacts application, topic analyzer, one-click-conferencing, and personal communication assistant.

The disclosed rich communication log applies the ideas of reducing unnecessary information while enriching relevant information to sessions in a unified inbox in a user customizable way. For example, Gmail Priority Inbox and Xobni only work for text-based emails. The disclosed approach, applying similar concepts to a unified inbox with different communication modalities, overcomes the following challenges. First, the system detects the implicit relationship among communication sessions with different communication channels. For example, it is very common that a user uses instant messaging (IM) to initiate a discussion, then escalates the conversation to a voice and video call, and in the meantime, the user may use emails to send documents. The IM session, voice and video call session, and emails are all related to each other. The system can detect this relationship and prioritize sessions and provide enriched information based on this relationship.

Second, based on the detected relationship, the system defines an appropriate way to prioritize messages with different communication modalities. For example, if a voice call is related to an email, the system can infer the call's semantic meanings based on the text of the email. The system prioritizes the call based on these semantic meanings.

Third, the system can present the new functions in a user friendly and customizable way. The rich communications log can drive a new way for user interactions on context-based unified communications. User activities and feedbacks can improve the application itself. For example, the system can adaptively adjust the weighting factors on people, time, thread, or topic for sorting communication sessions.

The system can provide this functionality through "analyzers". A "topic analyzer" can analyze semantic relationships among sessions. A "predictive contacts analyzer" can analyze people relationships among session participants. A "thread analyzer" can analyze non-semantic relationships. A "message importance analyzer" can handle the underlying intelligence for the rich communication log, using the result of the above three analyzers to calculate session importance values. The message importance analyzer can also feed back session importance values to other analyzers for their computation.

Figure 2:
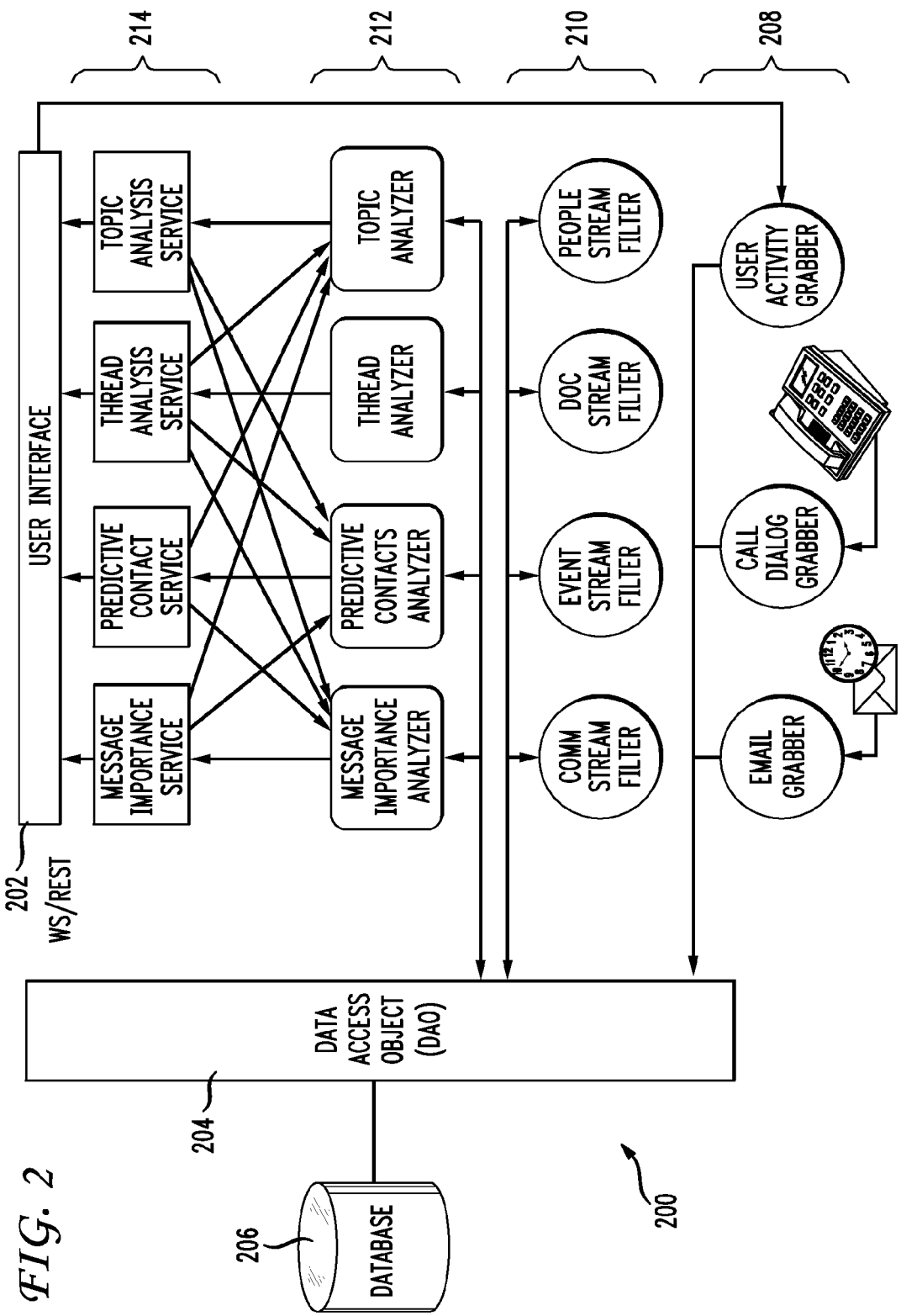
FIG. 2 illustrates an example rich communication log architecture.

FIG. 2 illustrates an example rich communication log overall architecture 200. This architecture 200 supports the rich communication log application that users can access via a user interface 202. In the system, the grabbers 208, such as an email grabber, call dialog grabber, and user activity grabber, collect raw communication session information. The grabbers 208 can store this information in the database. The filters 210, such as a communication stream filter, event stream filter, document stream filter, and people stream filter, can perform some initial processing on raw messages, such as spam filtering, privacy handling, and keyword extraction. The filters can act according to a company privacy policy, confidentiality policy, for example, by scrubbing privileged information that would otherwise be discoverable in litigation or that discloses personal information that a user has indicated are not to be shared with others. Core intelligence of the system can reside in and/or be embodied by the analyzers 212, such as a message importance analyzer, predictive contacts analyzer, thread analyzer, and topic analyzer, which perform context-based computing and data mining to interconnect sessions and retrieve useful information for users. The services 214, such as a message importance service 318, predictive contact service, thread analysis service, and topic analysis service, act as application interfaces to analyzers, and applications, such as the rich communication log, integrate multiple services, render data, and present user expected views. The various grabbers, filters, analyzers, and services can access a database 206 of communication information, personal information, metadata, and other information via one or more data access objects 204. The listed grabbers, filters, analyzers, and services are exemplary. The system can include more or less than those shown in any combination or permutation thereof.

The disclosure turns now to a discussion of the rich communication log application. Users expect different content and views under different contexts. For example, when a scheduled appointment is coming up soon, the user may expect to see related sessions to this appointment. But when a phone call comes in, the content can change to sessions related to the incoming caller. When there is no specific event, the user may expect to group his/her communication sessions by threads and sort the sessions based on time, priority, importance, or some other single factor and/or combination of factors. But upon a specific event happening, such as an incoming call or a scheduled appointment, the user may want to sort sessions based on the relevance value to the event and group the sessions by topics. Therefore, an exemplary rich communication log application can consider and support different contexts and possible views. In a default, or pre-communication event, context, no specific event is happening. The only factor that affects the content is the "current time". In an incoming/outgoing session context, the rich communication log shows related sessions based on the relevance values to the content or participants of the incoming/outgoing session. In an ad-hoc/meet-me conference context, conference participants and the conference appointment can all be used to calculate the relevance values of related sessions. In an upcoming event context, event time, participants, and topics can be used to calculate importance values. In an on-demand or query context, user inputs, such as keywords, selected people or events, can be used to perform context-based searching. In a post-communication analysis context, some information become available only when a session is terminated, such as the duration of a session, the offline tagging, and sometimes, the speech-to-text transcripts (which may be generated essentially in real time and become available after the session is terminated or can be generated and become available at a much later time). In a post-communication context, the rich communication log can help to retrieve related sessions and schedule future follow-up sessions.

As discussed above, different contexts can trigger different views to make it easier for users to find needed information. In an exemplary implementation, a view is a combination of multiple sorting, grouping, and factor weighting mechanisms. The system can sort based on time: a receiving (or starting) time of communication sessions, importance: how likely people will use the information, relevance: relationship among a set of information, and people: alphabetical order or importance order of people, for example. The system can group based on topic: semantic meaning of communication sessions, people: sessions related to a specific person, session status: answered, missed (for calls), and read, unread (for emails), and thread: sessions with triggering, containing, invoking, replying, and forwarding relationship. The system can apply weighting factors to place emphasis on time: more weight for time factor, place emphasis on people: more weight for people factor, place emphasis on topics: more weight for semantic meanings, and place emphasis on thread: more weight for thread relationship. The concept of views can help to provide a better user experience, and the content of views can be based on the computation of analyzers.

The disclosure turns to a more detailed discussion of the analyzers. The context management, sorting, grouping and factor weighting discussed in last section all require proper data analysis via the analyzers. The system can include many different analyzers, but this disclosure focuses on three exemplary analyzers: a message importance analyzer, a message relevance analyzer, and a communication thread analyzer.

The message importance analyzer can dynamically calculate the importance value of a user's communication sessions. "u" represents the user. The calculation has two parts. The first part generates pre-computed importance value. The second part handles an aging operation that adjusts importance value based on temporal factors. The formula is shown below:

$$w(s)=w(\text{raw})+a*w(\text{topic}_s)+b*w(\text{thread}_s)+c*w(\text{people}_s)$$
$$w_t(s)=w(s)*(1-d*(t-t_s)/T)(t-t_s \le T, a,b,c,d \le 1) \qquad \text{Equation (1)}$$

The first part of Equation (1) calculates pre-computed importance value of a session "s". The importance value is a composition of the importance values of related topics, threads, and people. The a,b,c,d are the weighting factors that can be customized by users or adaptively learned by the system. T represents the aging time limit, t is the current time, and $t_s$ is the session time. w(raw) represents the importance value of the session extracted from raw session data, e.g., the value of the "Importance" header of a session, or the duration of a call, or the length of an email. $w(\text{people}_s)$ represents the importance value of all the participants of session "s".

$$w(\text{people}_s)=\Sigma f(w(p),n) \qquad \text{Equation (2)}$$

where n is the number of participants. For each participant p, $$w(p)=w(\text{msgs}_p)+w(\text{global}_p)+w(\text{hierarchy})+w(\text{distance}) \qquad \text{Equation (3)}$$

In which, $w(\text{msgs}_p)$ is calculated based on the messages exchanged between the person "p" and the user "u"; $w(\text{global}_p)$ shows how popular the person "p" is for all the people in an enterprise; w(hierarchy) shows the position of "p" in a corporate hierarchy, while w(distance) shows the distance between "p" and the user in the corporate hierarchy.

In Equation (1), $w(\text{topic}_s)$ represents the importance value of all the related topics to this specific communication session. In an exemplary implementation, topic analysis can build a cluster model that groups documents based on their distances.

In Equation (1), $w(\text{thread}_s)$ represents the importance value of the thread in which the communication session "s" belongs. $\text{thread}_s$ is discussed in more detail below.

For every new communication session, the pre-computed importance value of the session can be calculated when the session terminates. The importance value of a new session will affect the importance value of its related topics, threads, or people, and in turn affect other related sessions and the new session itself. This can cause looping computation and should be avoided. To solve the problem, the system can stop updating the importance values of sessions if they have already been updated by introducing the new session.

The message relevance analyzer calculates the relevance value of a message to a person, event/session, or keyword. This is more complicated than message importance analyzer because it has one more input parameter to consider. Usually, the relevance to a person value is dynamically calculated when a user requires related sessions of a specific person. For example, for an incoming call, rich communication log can show the sessions related to the caller. For a person "p" and a communication session "s", r(p-s) represents the relevance value between "p" and "s".

$$r(p-s)=r(\text{sender}_s)+r(\text{recipients}_s)+k*w(p)r_t(p-s)=r(p-s)*(1-d*(t-t_s)/T)(t-t_s \le T, k, d \le 1) \qquad \text{Equation (4)}$$

r(sender) is the relevance value between the sender of "s" and "p". The simplest algorithm is r(sender)=1 if the sender is "p", otherwise r(sender)=0. A more sophisticated way is to find out how many sessions "p" and the sender of "s" participated together. The more the sessions, the bigger the r(sender) value is. The system can calculate the relevance value between a recipient of "s" and "p" in the same way. If a session has more than one recipient:

$$r(\text{recipients}_s)=\Sigma f(r(\text{recipients}),n) \qquad \text{Equation (5)}$$

w(p) is the same as what defined in Equation (3). Equation (4) can become more sophisticated by considering shared topics between person "p" and session "s", but that makes the computation more intensive, which may or may not scale appropriately based on the desired computational cost or other related threshold.

A value representing relevance to an event can be useful when a scheduled event is happening, such as a meet-me conference. A message and an event may be associated in multiple ways.

$$r(e-s)=a*r(e\text{-topic-}s)+b*r(e\text{-thread-}s)+c*r(e\text{-people-}s)r_t(e-s)=r(e-s)*(1-d*(t_e-t_s)/T)(t_e-t_s \le T, a,b,c,d \le 1) \qquad \text{Equation (6)}$$

For an event "e" and a session "s", r(e-thread-s) checks whether the event and the session are in the same thread or not, r(e-people-s) checks whether the event and the session have the same participants, and r(e-topic-s) checks whether the event and the session share the same topic.

The system can search sessions based on relevance to keywords.

$$r(k-s)=a*r(k\text{-topic-}s)+c*r(k\text{-people-}s)+s(k\text{-content-}s)$$
$$r_t(k-s)=r(k-s)*(1-d*(t-t_s)/T)(t-t_s \le T, a,c,d \le 1) \qquad \text{Equation (7)}$$

r(k-topic-s) checks whether the keyword "k" is part of a topic of the session "s", r(k-people-s) checks whether "k" is a participant of "s", and s(k-content-s) is the regular search result by searching "k" in the content of "s".

With respect to user feedback handling, when a user picks up a session in rich communication log to review, this user action implies to the system that the selected session is more important than the other unselected sessions. The system can then adjust the importance value of this session. The system can apply the adjustment to the underlying weighting factors (a, b, c, d in Equation (1)). Considering a specific time range T, the system can use ST to represent all the selected sessions in T. The adjustment can maximize the overall importance value of selected sessions by updating the value of a, b, c, and d. User activities can also help to build session relationships, which are discussed in more detail below.

As shown in FIG. 2, grabbers 208 collect raw data from different data sources. The grabbers 208 can use different APIs to acquire data, such as WebDAV for Microsoft Exchange server and Session Initiation Protocol (SIP) dialog event notification for voice and video call information. Data collection in enterprise environment introduces privacy concerns for properly protecting users' privacy. The system can mine data based only on a users' own data to mitigate these concerns. In addition, considering that in many enterprises raw email messages should only be permanently stored on email servers, the system can cache raw messages for data analysis for a limited period of time, then extract meta information of the messages and save only the meta information.

The disclosure turns to a discussion of communication threads. In one implementation, the system distinguishes between topic-based and thread-based relationships. A topic-based relationship groups sessions based on their semantic meanings, or by looking into the content of sessions and performing semantic analysis. A thread-based relationship groups sessions regardless of their semantic meanings. Usually, topic-based analysis is much more complex and error prone. Therefore, the system can try thread analysis using the explicit relationship among sessions based on message IDs, user activities, session participants, and session temporal relationships. The relationship can be invoking, containing, triggering, continuing, replying and forwarding. The result of thread-based analysis can help to analyze the topics of sessions.

Figure 3:
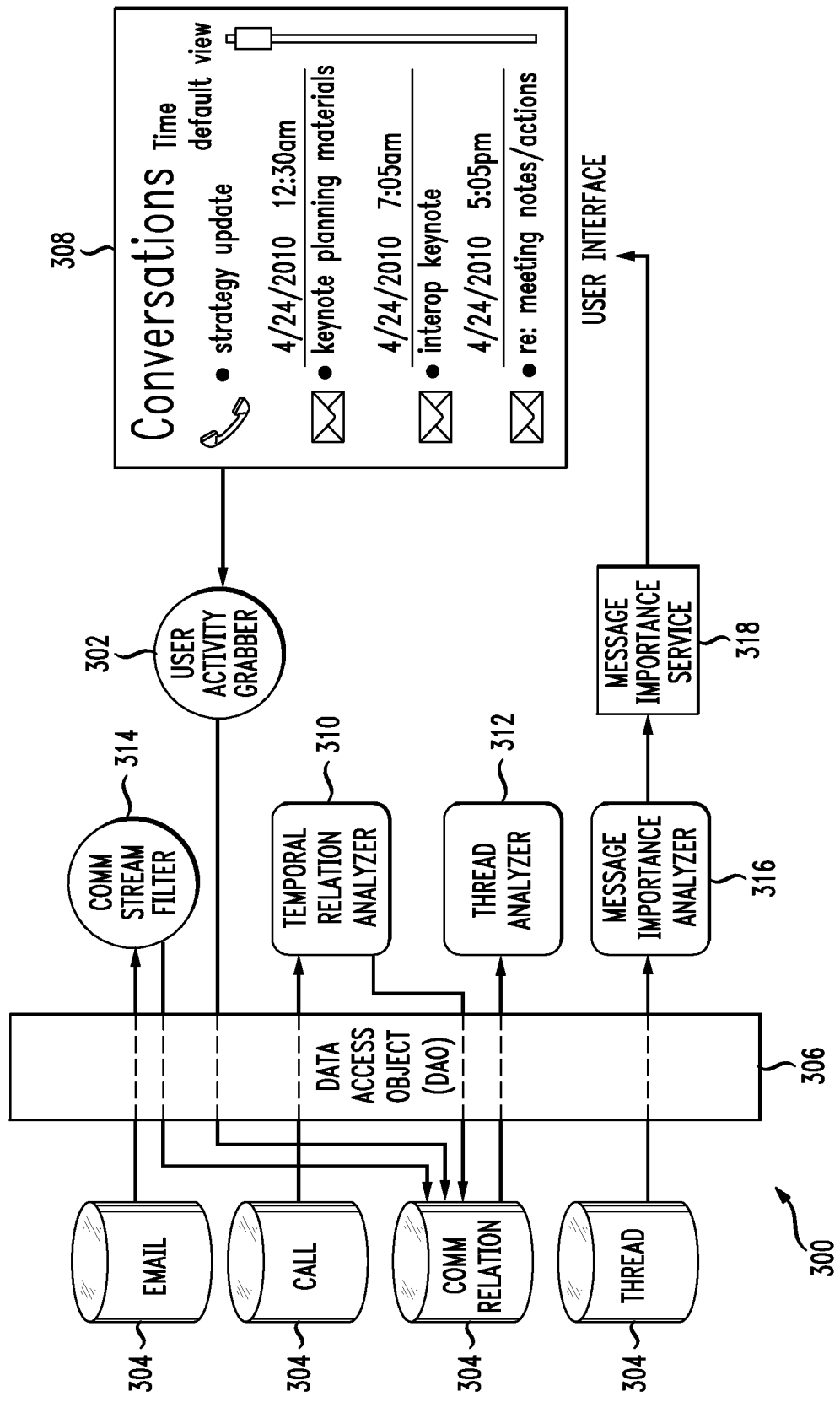
FIG. 3 illustrates an example thread analyzer data flow.

An invoking relationship means that a user starts a conversation from the context of another conversation. For example, when a user clicks-to-call a phone number in an email, the system can consider that the email and the call are in the same thread and have an invoking relationship. To detect an invoking relationship, the system tracks user activities. As shown in FIG. 3, the system 300 uses a "User Activity Grabber" 302 to catch user inputs via the user interface 308 or other data source. The grabber 302 detects user communication actions, such as 'click-to-call', and save the relationship into database 304 through a data access object 306.

Both the triggering and the containing relationship try to find out the temporal and participant relationship among sessions with different communication channels. Triggering means that a user starts one session because he or she just accessed another session. For example, user A receives an email from user B. After reading the email, user A immediately makes a call to user B. In another example, user A just finishes a call with user B. Immediately, user A sends an email to user B with some documents. In both examples, the system can consider the call and the email as being in a single thread with a triggering relationship.

Containing means that during a conversation such as a voice/video call, the participants communicate via other channels such as IM or email. The new session is contained in the original session and should be considered as part of a single thread. The system can use the following exemplary pseudocode to detect these two relationships:

```
if (overlap_participants_noself(s1, s2)) {
    // T_s - starting time, T_e - ending time
    if (T_s(s1) > T_e(s2) && T_s(s1)- T_e(s2) < threshold) {
        s2 triggers s1;
    }
    if (T_s(s1) < T_s(s2) < T_e(s1)) {
        s1 contains s2;
    }
}
```

Continuing means that one session immediately follow another session with same or substantially the same set of participants and optionally a same or similar media type. One scenario is a voice/video call, for example, when a call is dropped inadvertently and the users immediately attempt to reconnect.

Replying and forwarding simply inherit the thread definition from email systems. This can be easily handled through a communication stream filter 314 that handles emails. For call history, if the system can identify that one call is the callback of another call, these two calls also have "replying" relationship.

Relying only on these relationships to automatically identify threads can still introduce errors, however this can serve as a starting point. Users can manually manipulate threads initially generated by this automated analysis.

The system uses a message importance analyzer 316 to analyze the importance of a message. Moreover, the system uses a thread analyzer 312 which periodically checks session relationships. As shown in FIG. 3, the communication relation analyzer 310 builds session relationships from the data 304 stored by different grabbers and filters. Based on the session relationship information, the thread analyzer 312 assigns a thread-ID to the sessions.

Assigning thread-IDs to sessions is relatively straightforward, but because User Activity Grabber 302, Email Filter 314, and Temporal Relation Analyzer 310 are independent of each other, the system can encounter race conditions that affect thread assignment. For example, consider three users A, B, and C, who are communicating with each other. B sends an email ($S_1$) to A, then A immediately calls B ($S_2$) (triggering ($S_1,S_2$)). During the call, A emails B ($S_3$) (containing($S_2,S_3$)) which has C's contact information, B clicks-to-call C ($S_4$) from the email (invoking($S_3,S_4$)). Because "invoking" is handled by the user activity grabber 302, while "containing" and "triggering" is handled by temporal relation analyzer 310, the system can have "invoking" relationship before others in the communication relation table 304. So the system can first assign thread-1 to $S_3$ and $S_4$, then assign thread-2 to $S_1$ and $S_2$, then $S_2$ and $S_3$ are in the same thread. At that moment, the system can merge two threads.

Figure 4:
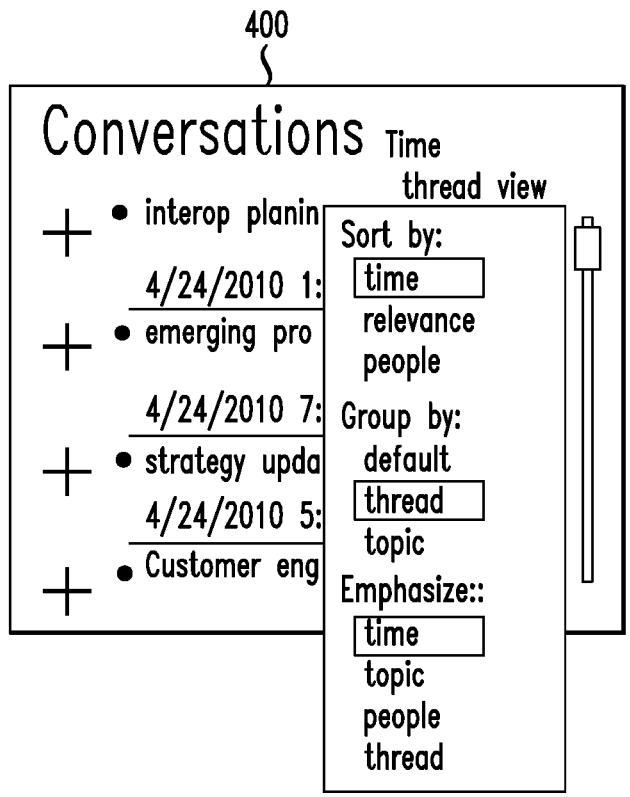
FIG. 4 illustrates an example rich communication log user interface.
Figure 5:
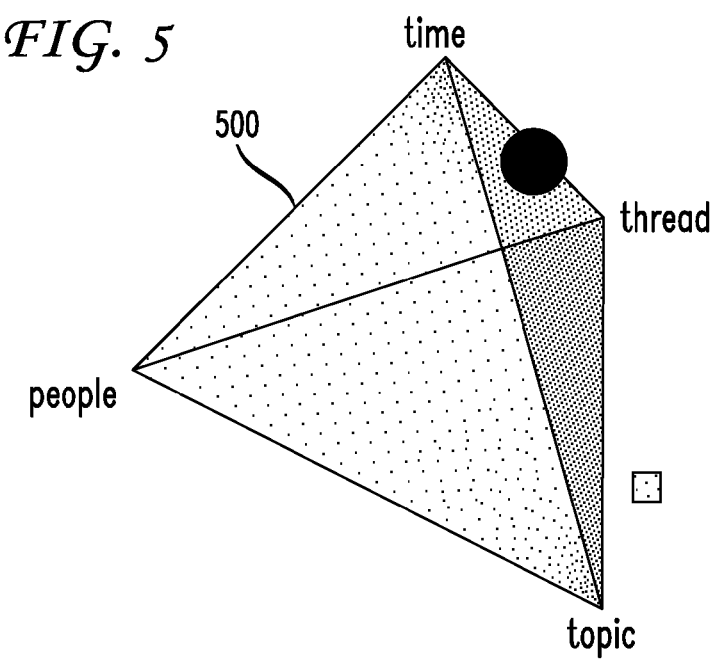
FIG. 5 illustrates an example weighting factors visualization.

The disclosure now turns to a discussion of implementation and evaluation of the principles disclosed herein. FIG. 4 illustrates an exemplary rich communication log user interface 400. This exemplary interface simply lists all the customizable parameters in a drop-down menu. The user interface 400 can include any number of intuitive approaches for users to configure their preferences. For example, FIG. 5 illustrates a triangular pyramid for configuring weighting factors as an alternative to the user interface shown in FIG. 4. Any other shape or representation can be used, such as a polygon, circle, oval, or three dimensional shape or shapes. A user can pinpoint his/her emphasis in this triangular pyramid. For example, FIGS. 4 and 5 each illustrate how a user prefers to give "time" and "thread" more weight for importance/relevance calculation.

For the thread analyzer 312, experimental tests were performed on a limited number of real communication sessions. The tests were not simulated and could not include a large number of real sessions for two reasons. First, the data from simulation is useless for validating the accuracy of thread analyzer because this analyzing process highly depends on human behaviors. Second, a user friendly interface is critical for real deployment and getting user feedback. However, based on testing a limited number of sessions, using session relationship to detect communication thread is a valid and practical approach and finding an appropriate threshold value for checking session temporal relationship is important. Table 1 illustrates results based on the testing on 30+ calls and related emails (excluding traditional replying and forwarding relationship). The numbers in each cell shows "number of matching/false positive/false negative".

TABLE 1

Session Temporal Relationships

| | | rel | | |
|---|---|---|---|---|
| time | containing | triggering (email-call) | triggering (call-email) | continuing |
| 1 min | 9/0/0 | 1/0/4 | 1/0/5 | 4/0/2 |
| 10 min | | 4/0/1 | 2/0/4 | 6/0/0 |
| 30 min | | 5/0/0 | 4/0/2 | 7/1/0 |
| 1 hour | | 5/0/0 | 5/0/1 | 7/1/0 |
| 3 hour | | 6/1/0 | 7/1/0 | 9/3/0 |

"Containing" relationships can usually can accurately identify a thread. One suitable threshold range for "continuing" relationship is between 1-10 minutes, a suitable threshold for "email triggering call" relationship can be 10-30 minutes, and a suitable threshold for "call triggering email" relationship can be 30-60 minutes. Because this temporal relationship is highly based on users' behaviors, different people may have different thresholds and the system can track, learn, and adapt the threshold for individual users, groups of users, etc. The thresholds can vary for each user by time, date, task, and other factors.

Figure 6:
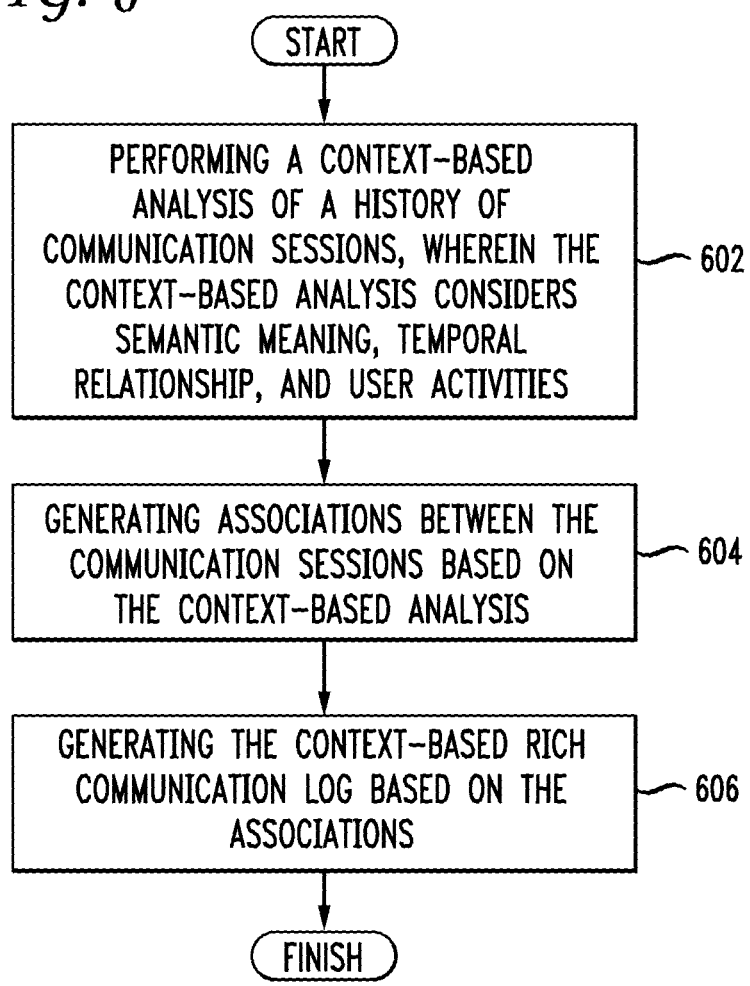
FIG. 6 illustrates a first exemplary method embodiment.

Having disclosed some basic system components, concepts, and experimental results, the disclosure now turns to the exemplary method embodiment shown in FIGS. 6 and 7. For the sake of clarity, the methods are discussed in terms of an exemplary system 100 as shown in FIG. 1 configured to practice the methods. The steps outlined herein are exemplary and can be implemented in any combination thereof, including combinations that exclude, add, or modify certain steps.

FIG. 6 illustrates a first exemplary method embodiment for generating a context-based rich communication log. The system 100 performs a context-based analysis of a history of communication sessions, wherein the context-based analysis considers semantic meaning, temporal relationship, and user activities (602). The communication sessions can include email, instant message, telephone call, voice over IP, text message, social network communication, documents, collaborative interactions, and/or multimedia interactions. The context-based analysis can be based on time, session participant identifications, ongoing events, and/or on-demand queries of the communication sessions. The system can further process the communication sessions to learn the semantic meaning, temporal relationship, and user activities.

The system 100 generates associations between the communication sessions based on the context-based analysis (604) and generates the context-based rich communication log based on the associations (606). The context-based rich communication log can be used as part of a predictive contacts application, a topic analyzer, a conferencing application, and/or a personal communication assistant, for example. The system can optionally present the context-based rich communication log to a user. In this context, the system can also receive a context-based query from a user, identify a subset of communication sessions from the history of communication sessions that matches the context-based query based on the context-based rich communication log, and return the subset of communication sessions to the user.

FIG. 7 illustrates a second exemplary method embodiment for generating a context-based communication log. In this exemplary embodiment, the system 100 detects an implicit relationship of communications across communication sessions (702). The communication sessions can be multiple different communication channel types. The system can include topic analyzer, a predictive contacts analyzer, a thread analyzer, and/or a message importance analyzer. The system 100 prioritizes the communications based on the implicit relationship (704). The system can prioritize the communications based on semantic meanings of the communications. The system can also process feedback from the user and adaptively adjust how the communications are prioritized based on the feedback. The feedback from the user can be explicit feedback for how to improve the prioritizations, or the feedback can include observations of how the user interacts with a user interface or other system components associated with the context-based communication log. The system 100 generates a context-based communication log based on prioritizing the communications (706) and outputs the context-based communication log to a user (708).

A unified communication application can help users focus on important communication sessions while providing enriched information for selected sessions. This application can sort and group sessions in a user desired view and update its contents by context-based computing. The approaches set forth herein address several challenges of prioritizing communication sessions with different modalities, finding their intrinsic relationships, and presenting user customizable views.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be incorporated into a web-based communication portal, a portable communication device, a desktop email application, and/or other communication application. Those skilled in the art will readily recognize various modifications and changes that may be made to the principles described herein without following the example embodiments and applications illustrated and described herein, and without departing from the spirit and scope of the disclosure. A computer-readable storage or device expressly excludes signals per se and the like.

We claim:

1. A method comprising:
performing an analysis of a history of communication sessions over two communication modalities, wherein the analysis considers a semantic meaning of the communication sessions, a temporal relationship among the communication sessions, and a user activity that transitions from a first communication session to a second communication session, wherein the first communication session and the second communication session are part of the communication sessions;
identifying a relationship among the communication sessions based on the analysis;
prioritizing the communication sessions based on the relationship to yield prioritized communication sessions;
generating a unified communication log based on the prioritized communication sessions;
outputting the unified communication log to a user;
processing feedback from the user to yield processed feedback, wherein the feedback from the user comprises an observation of how the user interacts with the unified communication log; and
based on the processed feedback, adaptively adjusting how the communication sessions are prioritized.

2. The method of claim 1, wherein the analysis is based on one of a time, a session participant identification, an ongoing event, and an on-demand query associated with one of the communication sessions.

3. The method of claim 1, wherein the unified communication log is used as part of one of a predictive contacts application, a topic analyzer, a conferencing application, and a personal communication assistant.

4. The method of claim 1, further comprising processing the communication sessions to learn the semantic meaning, the temporal relationships, and the user activity.

5. The method of claim 1, further comprising:
receiving a query from a user;
identifying a subset of communication sessions from the history of the communication sessions that matches the query based on the unified communication log; and
returning the subset of communication sessions to the user.

6. The method of claim 1, wherein the communication sessions comprise one of an email, an instant message, a telephone call, a voice: over-Internet-protocol communication, a text message, a social network communication, a document, a collaborative interaction, and a multimedia interaction.

7. The method of claim 1, wherein the relationships comprise one of an invoking relationship, a triggering relationship, a containing relationship, and a continuing relationship.

8. A system comprising:
a processor; and
a computer-readable storage medium storing instructions which, when executed by the processor, cause the processor to perform operations comprising:
detecting an implicit relationship of communications in multiple communication modalities across the communications, based on one of: a semantic meaning of the communications; a temporal relationship among the communications; and a user activity that transitions from a first communication to a second communication, wherein the first communication and the second session are part of the communications;
prioritizing the communications based on the implicit relationship to yield prioritized communications;
generating a unified communication log based on the prioritized communications;
outputting the unified communication log to a user as part of a communications interface;
processing feedback from the user to yield processed feedback, wherein the feedback from the user comprises an observation of how the user interacts with the unified communication log; and
based on the processed feedback, adaptively adjusting how the communications are prioritized.

9. The system of claim 8, wherein the communications are of a plurality of different communication channel types.

10. The system of claim 8, wherein the implicit relationship is one of an invoking relationship, a triggering relationship, a containing relationship, and a continuing relationship.

11. The system of claim 8, wherein the implicit relationship is detected via one of a topic analyzer, a predictive contacts analyzer, a thread analyzer, and a message importance analyzer.

12. A computer-readable storage device storing instructions which, when executed by a processor, cause the processor to perform operations comprising:
performing an analysis of a history of communication sessions over two communication modalities, wherein the analysis considers a semantic meaning of the communication sessions, a temporal relationship among the communication sessions, and a user activity that transitions from a first communication session to a second communication session, wherein the first communication session and the second communication session are part of the communication sessions;
identifying a relationship among the communication sessions based on the analysis;
prioritizing the communication sessions based on the relationship to yield prioritized communication sessions;
generating a unified communication log based on the prioritized communication sessions;
outputting the unified communication log to a user;
processing feedback from the user to yield processed feedback, wherein the feedback from the user comprises an observation of how the user interacts with the unified communication log; and
based on the processed feedback, adaptively adjusting how the communication sessions are prioritized.

13. The computer-readable storage device of claim 12, wherein the analysis is based on one of a time, a session participant identification, an ongoing event, and an on-demand query associated with one of the communication sessions.

14. The computer-readable storage device of claim 12, wherein the unified communication log is used as part of one of a predictive contacts application, a topic analyzer, a conferencing application, and a personal communication assistant.

15. The computer-readable storage device of claim 12, storing additional instructions which, when executed by the processor, cause the processor to perform the operations further comprising processing the communication sessions to learn the semantic meaning, the temporal relationships, and the user activity.

16. The computer-readable storage device of claim 12, storing additional instructions which, when executed by the processor, cause the processor to perform operations further comprising:
  receiving a query from a user;
  identifying a subset of communication sessions from the history of the communication sessions that matches the query based on the unified communication log; and
  returning the subset of communication sessions to the user.

17. The computer-readable storage device of claim 12, wherein the communication sessions comprise one of an email, an instant message, a telephone call, a voice-over-Internet-protocol communication, a text message, a social network communication, a document, a collaborative interaction, and a multimedia interaction.

* * * * *